United States Patent [19]
Garner

[11] Patent Number: 5,511,305
[45] Date of Patent: Apr. 30, 1996

[54] CORE FINISH TOOL FOR COAXIAL CABLE AND ASSOCIATED METHOD

[75] Inventor: Mark A. Garner, Newton, N.C.

[73] Assignee: CommScope, Catawba, N.C.

[21] Appl. No.: 254,163

[22] Filed: Jun. 6, 1994

[51] Int. Cl.$^6$ ................................................. H01B 13/20
[52] U.S. Cl. .................... 29/828; 30/90.4; 81/9.4
[58] Field of Search .................... 29/828, 566.3, 29/566.4, 857; 30/90.1, 90.4; 81/9.4, 9.44; 83/191

[56]     References Cited

U.S. PATENT DOCUMENTS

| | | | |
|---|---|---|---|
| 1,567,812 | 12/1925 | Ober et al. | 408/200 |
| 3,548,690 | 12/1970 | Horrocks | 30/90.1 |
| 3,566,466 | 3/1971 | Matthews | 30/90.1 |
| 4,345,375 | 8/1982 | Hayward | 30/90.1 |
| 4,379,665 | 4/1983 | Hendershot et al. | 408/204 |
| 4,459,881 | 7/1984 | Hughes, Jr. | 81/9.4 |
| 4,490,908 | 1/1985 | Tengler | 30/90.4 |
| 4,729,268 | 3/1988 | Morrow | 81/9.4 |
| 5,023,988 | 6/1991 | Lamond | 29/426.1 |
| 5,023,995 | 6/1991 | Kaplan | 30/90.1 |
| 5,105,542 | 4/1992 | Nakajima et al. | 30/90.1 |
| 5,155,912 | 10/1992 | Toth | 30/169 |

FOREIGN PATENT DOCUMENTS 1247967  9/1971  United Kingdom ............. 81/9.4

*Primary Examiner*—P. W. Echols
*Attorney, Agent, or Firm*—Bell, Seltzer, Park & Gibson

[57]          ABSTRACT

A tool and associated method facilitates removal of a residue of dielectric material from the inside surface of a tubular outer conductor of coaxial cable and strips a portion of the outer plastic jacket from the outer conductor in preparation for splicing or terminating the cable. The core finish tool includes a housing having a bore therethrough and an elongate metal body positioned in the bore. The elongate metal body has a hollow and enlarged frusto-conical front portion that defines a cutting member. The front portion is divided by four longitudinal slots which define four cutting member segments and respective adjacent arcuate segments that flex radially inward as the elongate body is inserted into the outer conductor to provide an outward radial bias to the cutting member. The residue is removed from the inside surface of the outer conductor as the tool is retracted from the cable. A cutting blade carried by the housing removes the outer plastic jacket as the tool is rotated about the cable.

30 Claims, 2 Drawing Sheets

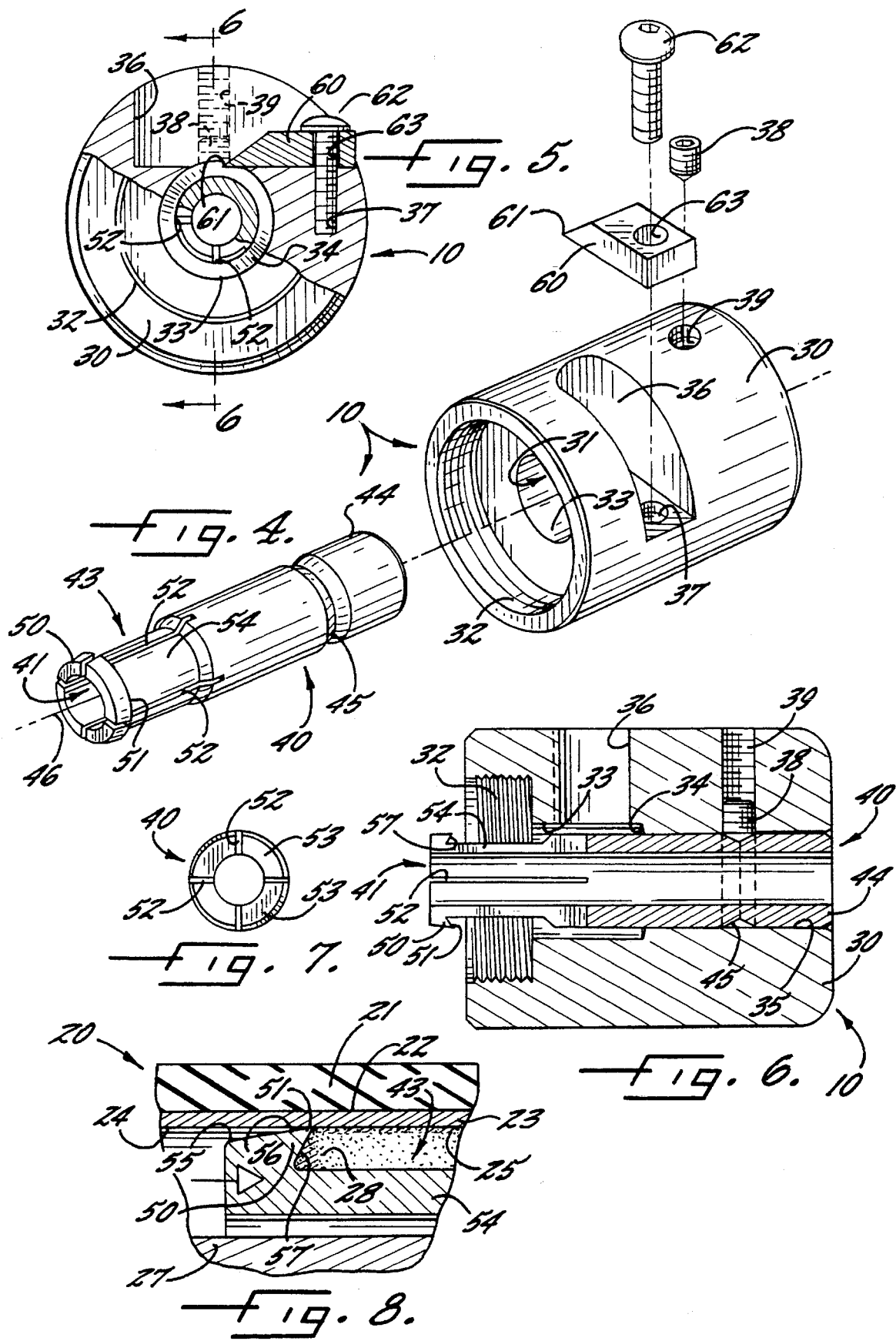

CORE FINISH TOOL FOR COAXIAL CABLE AND ASSOCIATED METHOD

FIELD OF THE INVENTION

The present invention relates to the field of coaxial cables and, more particularly, to a tool and method for preparing an end portion of a coaxial cable, such as for splicing or termination.

BACKGROUND OF THE INVENTION

In the cable TV industry, television signals are typically transmitted to subscribers via a coaxial cable network. In particular, a typical coaxial cable includes an elongate center conductor surrounded by a dielectric material, which, in turn, is surrounded by a tubular outer conductor. A typical coaxial cable also includes a protective plastic jacket surrounding the outer conductor.

In a typical coaxial cable network it is often necessary to form a connection between adjacent sections of the coaxial cable, or between the coaxial cable and associated equipment, such as amplifiers, etc. It is important that these connections establish low resistance electrical contact and have high mechanical integrity to ensure proper transmission of the signal over the service life of the network.

A connector is commonly used for joining two sections of coaxial cable, or for terminating a coaxial cable for coupling to electronic equipment. A typical connector includes a body portion secured to the cable end and is threaded to allow connection to electronic equipment or to a corresponding mating body portion secured to an adjacent cable end.

A typical connector has respective clamping members that grip the center and outer conductors, respectively, to establish electrical and mechanical contact to the conductors. The outer conductor is gripped by a pair of inner and outer connector clamping members. The inner clamping member is typically a rigid metal sleeve inserted into the interior of the tubular outer conductor. The outer clamping member includes a swaging collar to firmly grip the tubular outer conductor of the coaxial cable against the inner metal sleeve.

To permit insertion of the inner sleeve of the connector into the cable end underlying the outer conductor, it is first necessary to remove a portion of the dielectric material from between the center and outer conductors. It is also necessary to remove a portion of the plastic jacket covering the outer conductor to allow the outer clamping member to make the proper mechanical and electrical connection with the outer conductor.

Conventional core drilling tools are typically used for removing the portion of dielectric material from between the center and outer conductors to allow the insertion of the inner metal sleeve. Such core drilling tools typically include a fluted drill bit with a central bore therethrough to receive the center conductor. The bit has a sharpened leading edge and is rotated as it is inserted into the dielectric material of the coaxial cable to thereby sever and remove a portion of the dielectric material. See, for example, U.S. Pat. No. 5,023,995 to Kaplan; U.S. Pat. No. 4,459,881 to Hughes, Jr.; U.S. Pat. No. 4,345,375 to Hayward; and U.S. Pat. No. 1,567,812 to Ober et al.

Tools are also available for stripping away a desired portion of the protective plastic jacket from the outer conductor of the coaxial cable as shown, for example, in U.S. Pat. No. 5,105,542 to Nakajima et al. and U.S. Pat. No. 4,729,268 to Morrow. Such a tool typically includes a cylindrical housing serving as a handle for grasping by a user and for mounting a cutting blade. The housing may also carry a mandrel that is inserted into the coaxial cable to support the outer conductor as the tool is rotated and the desired jacket portion is removed by the cutting blade. The housing of the tool may also have a threaded end so that it can be removably secured to an associated core drilling tool as disclosed, for example, in U.S. Pat. No. 4,459,881 to Hughes, Jr. and U.S. Pat. No. 4,729,268 to Morrow.

A conventional core drilling tool removes the bulk of the dielectric material from within the cable. Unfortunately, however, a thin residue or film of the dielectric material typically remains on the inside surface of the outer conductor as disclosed in U.S. Pat. No. 4,379,665 to Hendershot et al. This residue, in turn, may be trapped between the inside surface of the outer conductor and the inner sleeve of a connector. Over time, this residue may soften and migrate from the conductor surface thereby causing the clamping members to loosen. Accordingly, the mechanical strength of the connector is reduced and the connection may separate.

SUMMARY OF THE INVENTION

In view of the foregoing background, it is therefore an object of the present invention to provide a tool and associated method for readily and effectively removing a dielectric material residue from the inside surface of an outer conductor of coaxial cable to ensure a secure and trouble-free connection.

It is another object of the present invention to provide a tool for removing a portion of a coaxial cable jacket.

These and other objects, advantages and features of the present invention are provided by a core finish tool including an elongate body having a front portion defining a cutting member that is inserted into an end of a coaxial cable and withdrawn to sever and remove the dielectric residue that is left after drilling out a portion of the dielectric material in preparing the cable end, such as for splicing or termination. Accordingly, a connection may be made to the coaxial cable end that is secure and that will not loosen over time.

More particularly, the elongate body is preferably metal and is preferably cylindrical in shape. The elongate body also has a hollow front portion that is larger in outside diameter than a longitudinally adjacent portion to thereby define the cutting member. The enlarged front portion is preferably frusto-conically shaped with the smaller diameter portion being outermost to facilitate positioning within the tubular outer conductor. In addition, the larger diameter portion of the cutting member defines a rearward facing cutting edge. The rearward facing surface of the cutting member is preferably undercut, thereby enhancing the sharpness of the cutting edge and providing a recess for collection of residue removed from the outer conductor.

The hollow front portion of the elongate body preferably has at least four radially symmetric slots extending longitudinally which divide the cutting member into four cutting member segments. The longitudinal slots also extend to the longitudinally adjacent reduced diameter portion to divide the reduced diameter portion into arcuate segments. Each of the arcuate segments is preferably of such a resiliency as to be flexed radially inwardly by the tubular outer conductor when the elongate metal body is inserted into the cable end. In addition, the larger diameter portion of the frusto-conical cutting member is slightly larger than the inside diameter of the tubular outer conductor so that the cutting member segments are flexed radially inward as the cutting member is inserted into the tubular outer conductor. This provides the desired outward biasing force to the cutting member segments for the effective removal of residue from the inside surface of the outer conductor when the tool is retracted.

The elongate metal body is preferably positioned within the bore of a generally cylindrical housing adapted to be grasped by the user as the tool is manipulated. A cutting blade may also preferably be mounted to the housing of the tool. The cutting blade has a cutting edge that serves to remove a desired portion of the protective jacket from the outer conductor as the housing is rotated about the cable. In addition, the elongate body being positioned within the tubular outer conductor as the jacket is removed serves as a supporting mandrel to prevent deformation of the outer conductor that could otherwise occur if no internal support were provided to the outer conductor.

BRIEF DESCRIPTION OF THE DRAWINGS

FIG. 4 is an enlarged exploded perspective view of the core finish tool of the present invention.

FIG. 5 is an end view, partially in section, of the core finish tool of the present invention.

FIG. 6 is a side cross-sectional view of the core finish tool of the present invention taken along lines 6—6 of FIG. 5.

FIG. 7 is an end view of the elongate metal body of the core finish tool according to the invention as shown in FIG. 6.

FIG. 8 is a greatly enlarged fragmentary cross-sectional view of a portion of the cutting member of the tool of the present invention, illustrating the removal of the dielectric material residue from the tubular outer conductor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
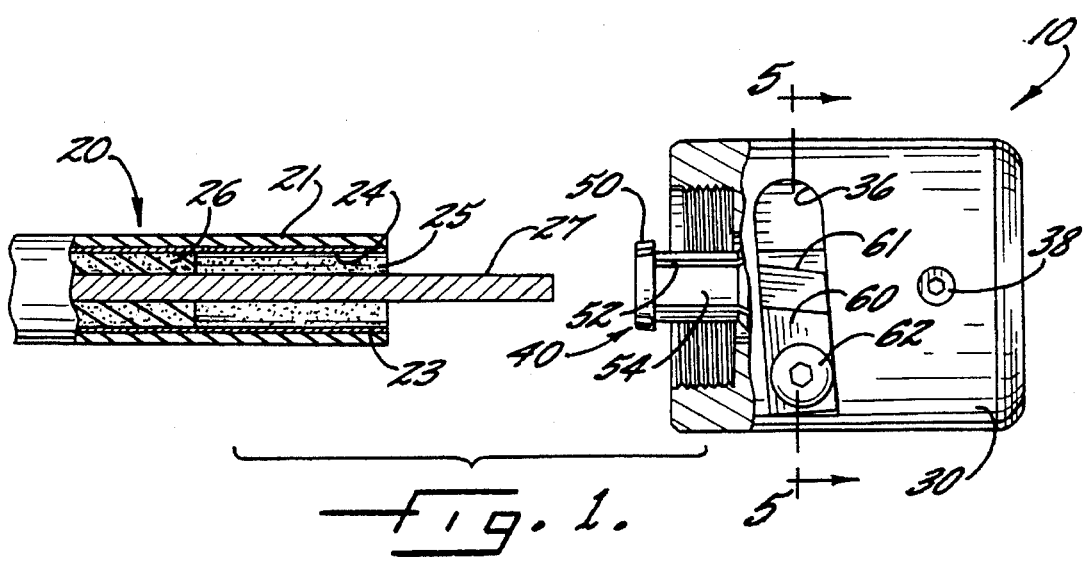
FIG. 1 is a side elevational view, partially in section, of the coaxial cable end and the core finish tool of the present invention prior to insertion of the tool into the cable end, and illustrating the dielectric material residue on the inner surface of the outer conductor.
Figure 2:
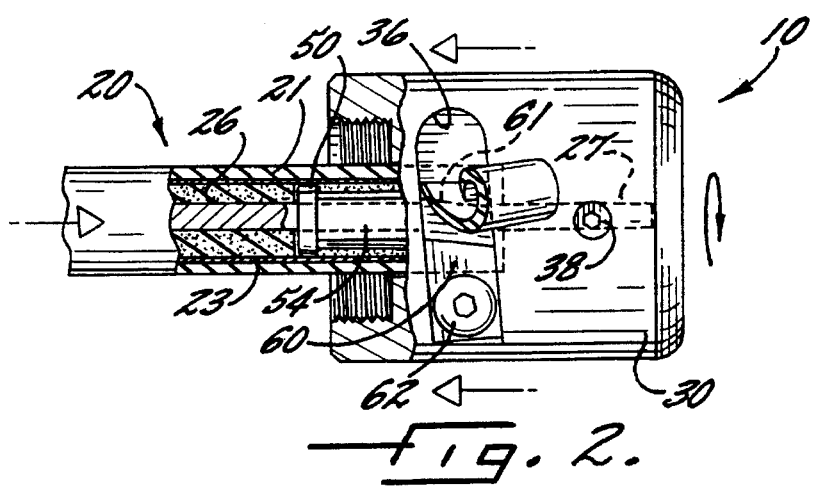
FIG. 2 is a side elevational view, partially in section, of the coaxial cable end and the core finish tool of the present invention, and illustrating the tool inserted into the cable end and rotated about the cable.
Figure 3:
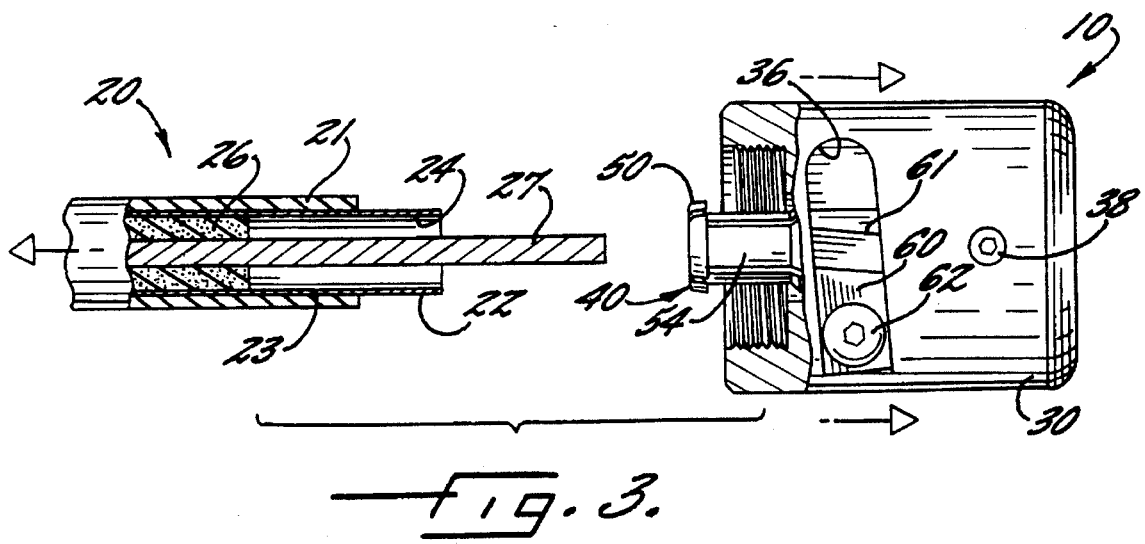
FIG. 3 is a side elevational view, partially in section, of the coaxial cable end and the core finish tool after the tool has been retracted.

As illustrated in FIGS. 1–3, the operation of the core finish tool 10 of the present invention is first described. A coaxial cable end 20 is initially prepared by drilling out a portion of the dielectric core material 26 to produce the cable end as shown in FIG. 1 with a thin dielectric film or residue 25 remaining on the inner surface 24 of the outer conductor 23. A conventional core drilling tool of the type as disclosed, for example, in U.S. Pat. No. 4,729,268 to Morrow and U.S. Pat. No. 4,459,881 to Hughes, Jr. may be used for producing the cable end as shown in FIG. 1, as would be readily understood by those skilled in the art. In the illustrated embodiment, the cable end 20 is also prepared so that a portion of the center conductor 27 extends outwardly from the end of the cable.

Prior to the present invention, a connector, not shown, would be attached to the cable end 20 while the dielectric residue 25 remained on the inner surface 24 of the tubular outer conductor 23. Unfortunately, the residue 25 has a tendency to migrate out from beneath an adjacent clamping member of the connector thereby loosening the connector over time. The core finish tool 10 according to the present invention is advantageously used to remove the residue 25 and thereby produce a more secure and durable connection.

The elongate metal body 40 has a cutting member 50 formed on the outermost end thereof. The user grasps the housing 30 of the core finish tool 10 to insert the cutting member 50 into the cable end 20 as shown in FIG. 2. The elongate body 40 is preferably hollow throughout its entire length to receive therein the outwardly extending portion of the center conductor 27. Moreover, the cutting member 50 is radially outwardly biased, as more fully discussed below, to sever the residue 25 from the inside surface 24 of the outer conductor 23 as it is removed.

Another feature of the core finish tool 10 according to the invention is that the cable jacket 21 may also be stripped during the same procedure for removing the dielectric residue 25 from the inner surface 24 of the outer conductor 23. The housing 30 carries a cutting blade 60 connected to the housing by a screw 62. Accordingly, as the cutting member 50 of the elongate body 40 is pushed into the outer conductor 23 of the cable end 20, the plastic jacket 21 is slit by the cutting edge 61 of the cutting blade 60. The housing 30 of the core finish tool 10 may then be rotated relative to the cable end 20 so that the cutting blade 60 strips the plastic jacket 21 away from the outer conductor 23 as also shown in FIG. 2. The elongate body 40 positioned within the outer conductor 24 also serves as a supporting mandrel to prevent deformation of the outer conductor as the jacket 21 is stripped away.

Referring now more particularly to FIG. 3, the core finish tool 10 is retracted from the cable end 20 thereby removing the severed dielectric residue 25. The thus prepared cable end 20 is free of dielectric material on the inner surface 23 of the outer conductor 24 to ensure a secure grip with a connector. In addition, a desired portion of the cable jacket 21 is removed from the cable end 20.

Referring now to FIGS. 4–8, the core finish tool 10 of the present invention is described in greater detail. The elongate metal body 40 of the core finish tool 10 is preferably generally cylindrical in shape and has at least a front portion 41 thereof that is hollow to allow the center conductor 27 of the coaxial cable 20 to pass therethrough when the elongate metal body is inserted into the outer conductor 23. As shown in the illustrated embodiment, the elongate metal body 40 is preferably hollow throughout its entire length.

The outermost portion of the hollow front portion 41 of the elongate metal body 40 is of a larger diameter than the longitudinally adjacent and reduced diameter portion 43 of the elongate body thereby defining the cutting member 50. The cutting member 50 is preferably frusto-conically shaped with the smaller diameter portion 55 thereof being outermost (FIG. 8). This smaller diameter portion 55 is smaller than the inside diameter of the tubular outer conductor 23, so as to facilitate insertion and positioning of the cutting member 50 within the outer conductor 23. The larger diameter portion 56 of the frusto-conically shaped cutting member 50 is slightly larger than the inside diameter of the outer conductor 23.

In the illustrated embodiment, the cutting member 50 and hollow front portion 41 of the elongate body 40 are provided with four longitudinal slots 52 therein arranged radially symmetrically about an central axis 46 of the elongate body. The slots 52 divide the cutting member 50 into four cutting member segments 53. The longitudinal slots 52 also divide the longitudinally adjacent portion 43 into four arcuate segments 54. Each arcuate segment 54 is connected to and extends rearwardly from a respective cutting member segment 53.

The slots 52 allow the arcuate segments 54 to be of such resiliency that they flex radially inwardly as the cutting member 50 is inserted into the tubular outer conductor 23. Thus, the resiliency of the arcuate segments 54 imparts an outward radial bias to the cutting member segments 53 connected thereto when the elongate metal body 40 of the core finish tool is inserted into the cable. The desired outwardly radial force for effective removal of the residue or film 25 from the inside surface 24 of the tubular outer conductor 23 is thereby applied to the cutting member segments 53 and the dielectric residue 25 is thus readily severed and removed as the tool 10 is retracted from the outer conductor 23. While the outward radial bias applied to the cutting member segments 53 must be sufficient to effectively remove the residue 25 from the inside surface 24 of the tubular outer conductor 23, the force should not be so large as to deform the outer conductor 23, since such conductors are commonly made of aluminum.

The desired resiliency of the arcuate segments 54 is based upon the thickness and type of metal of the arcuate segments, and the number and length of the longitudinal slots 52 defining the segments, as would be readily understood by those skilled in the art. In a preferred embodiment, the longitudinal slots 52 are at least about ½ inch in length, although it would be readily understood by one skilled in the art that the length of the slots, or other parameters, can be varied to obtain the desired resiliency of the arcuate segments.

Referring now particularly to FIG. 8, the rearward facing surface 57 of the frusto-conically shaped cutting member 50, that is, the surface adjacent the larger diameter portion 56 of the cutting member 50, is undercut so as to form a rearward facing cutting edge 51 at the periphery of the cutting member 50 for more effectively removing the residue or film 25. The undercut also defines a recess adjacent the reduced portion 43 of the elongate metal body 40 that serves to collect the severed residue 28 once it has been removed from the inside surface 24 of the outer conductor 23.

The bore 31 of the housing 30 is defined by three adjacent sections 32, 33 and 35. The front section 32 is the largest in diameter and is internally threaded to allow the tool 10 to be attached to an associated core drilling tool, not shown, as disclosed, for example, in U.S. Pat. No. 4,729,268 to Morrow and U.S. Pat. No. 4,459,881 to Hughes, Jr. The medial section 33 of the housing bore 31 is smaller in diameter than the outermost section 32, but is slightly larger than the outside diameter of the coaxial cable 20 including the plastic jacket 21. The rear section 35 of the housing bore is smaller in diameter than the coaxial cable 20 and is of the same nominal size as the outside diameter of the elongate metal body 40. In other words, the rear section 35 defines a stop shoulder 34 that abuts the end of the outer conductor 23 and the plastic jacket 21 when the elongate metal body 40 is inserted into the cable end 20. The stop shoulder 34 assures the proper depth of insertion into the cable end.

The rear portion 44 of the elongate metal body 40 is held in the bore 31 of the housing 30 by fastening means. In the illustrated embodiment as best shown in FIGS. 4 and 6, the fastening means includes a locking screw 38 received in a threaded opening 39 in the housing 30. The locking screw 38 acts in cooperation with an annular groove 45 provided in the rear portion 44 of the elongate metal body 40.

The cutting blade 60 for stripping the jacket is mounted in a recess 36 formed in the housing 30. The blade 60 is secured to the housing 30 by a screw 62 secured through an opening 63 in the blade and is received by a threaded opening 37 in the housing. The cutting blade 60 has a cutting edge 61 that extends into the medial section 33 of the housing bore 31.

As best shown in FIG. 5, the cutting edge 61 is positioned within the medial section 33 of the bore 31 to a radial depth to penetrate the jacket 21 when the elongate metal body 40 is inserted into the cable end 20. Accordingly, the cutting blade 60 slits and removes the plastic jacket when the core finish tool 10 is rotated about the cable, but will not damage the outside surface 22 of the tubular outer conductor 23.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A core finish tool for removing a residue of dielectric material from an inside surface of a tubular outer conductor of a coaxial cable in preparation for splicing or terminating the coaxial cable, said tool comprising:

a housing having a bore therethrough; and an elongate body positioned in said bore and having a substantially cylindrical and hollow front portion, an outermost portion of said hollow front portion of said body being of a larger diameter than a longitudinally adjacent portion and defining a cutting member, said cutting member having a cutting edge, said hollow front portion having a plurality of longitudinal slots therein dividing said cutting member into cutting member segments and also defining a plurality of arcuate segments connected to and extending rearwardly from the cutting member segments, each of said arcuate segments being of such resiliency as to be flexed radially inwardly by the tubular outer conductor of the cable when the elongate body is inserted therein so as to thereby impart an outward bias to the cutting member segments and apply a desired force for removal of residue from the inside surface of the outer conductor when the elongate metal body is retracted from the tubular outer conductor.

2. A tool according to claim 1 wherein said elongate body comprises metal.

3. A tool according to claim 1 wherein said cutting member is frusto-conically shaped with a smaller diameter portion thereof being outermost so as to facilitate positioning of the cutting member within the tubular outer conductor.

4. A tool according to claim 1 wherein said cutting member has an undercut rearward facing surface for enhancing the sharpness of said cutting edge of said cutting member and for providing a recess for collection of residue removed from the outer conductor.

5. A tool according to claim 1 wherein said plurality of longitudinal slots are radially symmetric about a central axis of said elongate body.

6. A tool according to claim 1 wherein each of said longitudinal slots is at least one-half inch in length.

7. A tool according to claim 1 wherein said plurality of longitudinal slots are at least four in number.

8. A tool according to claim 1 wherein said elongate body is hollow throughout an entire length thereof.

9. A tool according to claim 1 wherein said elongate body has an annular groove in a portion thereof, and further comprising a fastener carried by said housing and cooperating with said annular groove for securing said elongate body in said housing.

10. A tool according to claim 1 wherein said housing has a generally cylindrical shape adapted to be grasped by a user to manipulate said tool.

11. A core finish tool for removing a residue of dielectric material from an inside surface of a tubular outer conductor of a coaxial cable and for also removing an outer jacket portion from the outer conductor in preparation for splicing or terminating the coaxial cable, said tool comprising:

a housing having a bore therethrough;

an elongate body positioned in said bore and connected to said housing, said elongate body having a substantially cylindrical and hollow front portion, an outermost portion of said hollow front portion of said body being of a larger diameter than a longitudinally adjacent portion and defining a cutting member, said cutting member having a cutting edge, said hollow front portion having a plurality of longitudinal slots therein dividing said cutting member into cutting member segments and also defining a plurality of arcuate segments connected to and extending rearwardly from the cutting member segments, each of said arcuate segments being of such resiliency as to be flexed radially inwardly by the tubular outer conductor of the cable when the elongate body is inserted therein so as to thereby impart an outward bias to the cutting member segments and apply a desired force for removal of residue from the inside surface of the outer conductor when the tool is retracted from the tubular outer conductor; and a cutting blade connected to said housing and having a cutting edge for removing the outer jacket portion from the tubular outer conductor upon rotation of said tool when said elongate body is inserted within said tubular outer conductor.

12. A tool according to claim 11 wherein said elongate body comprises metal.

13. A tool according to claim 11 wherein said cutting member is frusto-conically shaped with a smaller diameter portion thereof being outermost so as to facilitate positioning of the cutting member within the tubular outer conductor.

14. A tool according to claim 11 wherein said cutting member has an undercut rearward facing surface for enhancing the sharpness of said cutting edge of said cutting member and for providing a recess for collection of residue removed from the outer conductor.

15. A tool according to claim 11 wherein said plurality of longitudinal slots are radially symmetric about a central axis of said elongate body.

16. A tool according to claim 15 wherein: said longitudinal slots are at least one-half inch in length.

17. A tool according to claim 15 wherein said plurality of longitudinal slots are at least four in number.

18. A tool according to claim 11 wherein said elongate body is hollow throughout an entire length thereof.

19. A tool according to claim 11 wherein said elongate body has an annular groove in a portion thereof, and further comprising a fastener carried by said housing and cooperating with said annular groove for securing said elongate body in said housing.

20. A tool according to claim 11 wherein said housing has a generally cylindrical shape adapted to be grasped by a user to manipulate said tool.

21. A tool for removing a residue of dielectric material from an inside surface of a tubular outer conductor of a coaxial cable in preparation for splicing or terminating the coaxial cable, said tool comprising:

an elongate body having a substantially cylindrical and hollow front portion, an outermost portion of said hollow front portion of said body being of a larger diameter than a longitudinally adjacent portion and defining a cutting member, said cutting member having a cutting edge, said hollow front portion having a plurality of longitudinal slots therein dividing said cutting member into cutting member segments and also defining a plurality of arcuate segments connected to and extending rearwardly from the cutting member segments, each of said arcuate segments being of such resiliency as to be flexed radially inwardly by the tubular outer conductor of the cable when the elongate body is inserted therein so as to thereby impart an outward bias to the cutting member segments and apply a desired force for removal of residue from the inside surface of the outer conductor when the elongate metal body is retracted from the tubular outer conductor.

22. A tool according to claim 21 wherein said elongate body comprises metal.

23. A tool according to claim 21 wherein said cutting member is frusto-conically shaped with a smaller diameter portion thereof being outermost so as to facilitate positioning of the cutting member within the tubular outer conductor.

24. A tool according to claim 21 wherein said cutting member has an undercut rearward facing surface for enhancing the sharpness of said cutting edge of said cutting member and for providing a recess for collection of residue removed from the outer conductor.

25. A tool according to claim 21 wherein said plurality of longitudinal slots are radially symmetric about a central axis of said elongate body.

26. A tool according to claim 21 wherein said longitudinal slots are at least one-half inch in length.

27. A tool according to claim 21 wherein said plurality of longitudinal slots are at least four in number.

28. A tool according to claim 21 wherein said elongate body is hollow throughout an entire length thereof.

29. A method for preparing a coaxial cable end, the coaxial cable being of the type including an elongate center conductor, a tubular outer conductor surrounding the center conductor, and dielectric material between the center and outer conductors, the method comprising the steps of:

removing a portion of the dielectric material from an interior portion of the coaxial cable end and having an effect of leaving a residue of dielectric material on an inner surface of the outer conductor;

inserting into the interior of the coaxial cable end an elongate body having a substantially cylindrical and hollow front portion for receiving a portion of the center conductor wherein an outermost portion of the hollow front portion of the elongate body has a larger diameter then a longitudinally adjacent portion of the elongate body to thereby define a cutting member, wherein the hollow front portion of the elongate body is divided by a plurality of longitudinal slots which also divide the cutting member into cutting member segments and which define a plurality of arcuate segments connected to and extending rearwardly from the cutting member segments such that said inserting step comprises the step of flexing the arcuate segments radially inwardly as the elongate body is inserted into the interior of the coaxial cable end to thereby radially outwardly bias the cutting member segments; and withdrawing the elongate body from the coaxial cable end such that the radially outwardly biased cutting member segments sever and remove the residue of dielectric material left on the inner surface of the outer conductor during said removing step.

30. A method according to claim 29 wherein the coaxial cable further includes a jacket the outer conductor, wherein the cutting member is carried by a housing and the housing also carries a cutting blade, and further comprising the step of removing a portion of the jacket from the tubular outer while the cutting member is inserted into the cable end so that the cutting blade removes a portion of the jacket.

* * * * *

UNITED STATES PATENT AND TRADEMARK OFFICE
CERTIFICATE OF CORRECTION

PATENT NO.   :   5,511,305
DATED        :   April 30, 1996
INVENTOR(S)  :   Mark A. Garner It is certified that error appears in the above-identified patent and that said Letters Patent is hereby corrected as shown below:

Col. 9, line 1, after "conductor" insert comma (,).

Col. 9, line 3, delete "then" and insert -- than -- therefor.

Col. 10, line 7, after "jacket" insert -- surrounding --.

Col. 10, line 10, after "outer" insert -- conductor of the coaxial cable by rotating the housing --.

Signed and Sealed this

Fifth Day of November, 1996

Attest:

BRUCE LEHMAN

Attesting Officer    Commissioner of Patents and Trademarks